Sept. 9, 1969  R. SIMMEN  3,465,676
SAFETY SYSTEM FOR THE FUSE OF A GYRATORY MISSILE
Filed Nov. 27, 1967

INVENTOR
ROBERT SIMMEN
BY Emery G. Groff Jr.
ATTORNEY

United States Patent Office 3,465,676
Patented Sept. 9, 1969

3,465,676
SAFETY SYSTEM FOR THE FUSE OF A
GYRATORY MISSILE
Robert Simmen, Geneva, Switzerland, assignor to Mefina
S.A., Fribourg, Switzerland, a company of Switzerland
Filed Nov. 27, 1967, Ser. No. 685,919
Claims priority, application Switzerland, Oct. 5, 1967,
13,994/67
Int. Cl. F42c 15/26
U.S. Cl. 102—80      4 Claims

ABSTRACT OF THE DISCLOSURE

A safety system for the fuse of a gyratory missile allowing a primer-carrying member to enter its operative position facing a striker, for instance, only when both following conditions are associated: (a) the centrifugal force produced upon firing of the missile out of a rifled gun has released first locking means such as a transverse bolt, urged by a spring inwardly against said primer-carrying member, and (b) the axial acceleration at the start has released second locking means such as a longitudinal bolt holding the primer-carrying member against movement; said last release is obtained in two stages, to wit: a receding stage produced by the actual acceleration and releasing of a blocking means such as a ball or similar movable member opposing the releasing movement of the second locking means and a forward stage actually releasing the primer-carrying member at the end of the initial acceleration of the missile.

---

The present invention has for its object a safety system for the fuse of a gyratory missile. Said system includes a member carrying the pyrotechnical primer adapted to move between an inoperative safe position and a set operative position under the control of centrifugal force, while locking means sensitive to centrifugal force hold said member in its inoperative position.

Fuses for missiles are already known, which are provided with such locking means sensitive to centrifugal force. However, a fuse provided only with such locking means sensitive to centrifugal force is not sufficiently safe since, in the case of a missile falling during transportation, it may occur that said missile starts rolling and the locking means are thus released so that no protection is then retained for the fuse.

It has been attempted to eliminate this drawback by associating in a common safety arrangement the operation of centrifugal force and that of axial acceleration. However, the known arrangements of this type do not ensure a sufficiently reliable operation. It may occur with said known arrangements that the shock of a falling missile causes the member sensitive to axial acceleration to be released without it being possible for it to return into its said inoperative position, even if no centrifugal force has acted on the missile. The safety system according to the present invention has for its object to eliminate said drawback.

Said safety system according to the present invention includes second locking means for the primer-carrying member, which means comprises a bolt retaining the latter and adapted when operative to be held across the path of said member, said bolt being rigid with a plunger piston which is subjected to the action of a spring. Said spring urges the bolt away from the path of said primer-carrying member by causing the plunger piston to slide inside a cylinder the axis of which is parallel with that of the fuse, and a movable part carried inside said cylinder prevents the piston from reaching the end of the latter. Said cylinder is provided at a point along its length with a lateral port facing away from the fuse axis so as to allow said movable part to be urged centrifugally out of the cylinder after the missile has been subjected to an axial acceleration which has shifted the piston back against the action of the spring. The primer-carrying member is released only when axial acceleration has terminated and the piston engages the front end of the cylinder to shift the bolt out of the path of said member.

Figure 2:
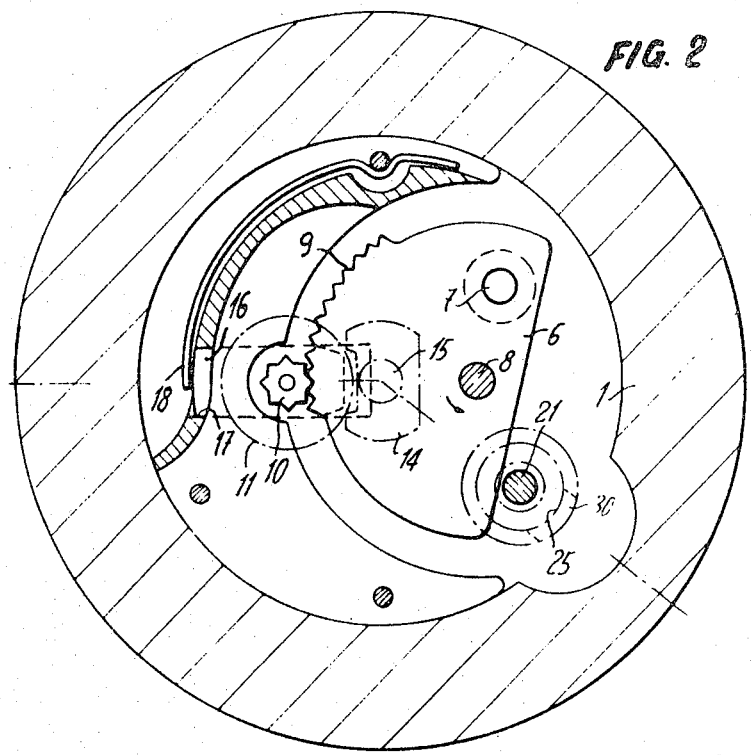
Figure 1:
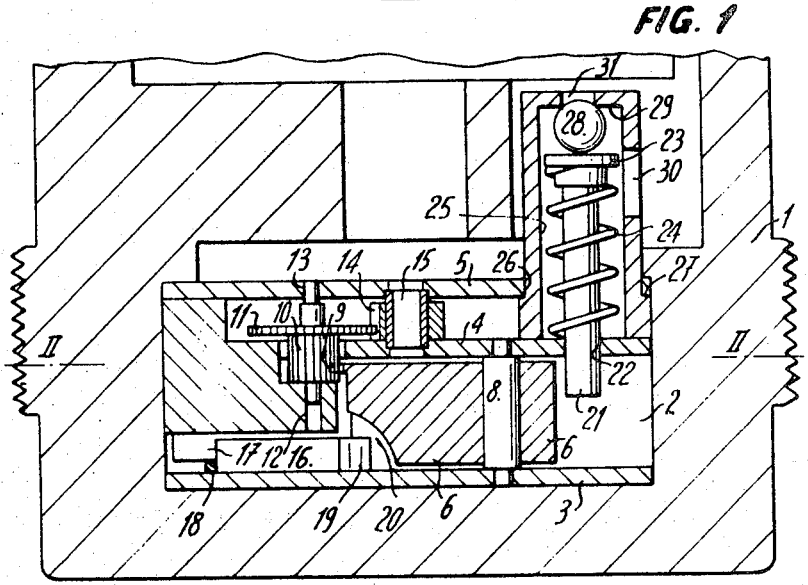

The accompanying drawings illustrate diagrammatically and by way of example an embodiment of a safety system for the fuse of a missile subjected to a gyratory motion as provided by the invention. In said drawings:

FIG. 1 is an axial sectional view of said safety system.
FIG. 2 is an axial sectional view through line II—II of FIG. 1.

As illustrated in the drawings, the fuse includes a body 1 adapted to be screwed into the body of the missile which is not illustrated. Said body 1 is provided with a central recess 2 enclosing a safety system. The latter includes three parallel plates 3, 4, 5. Between the plates 3 and 4, there is inserted a member 6 carrying eccentrically a pyrotechnical primer 7. Said carrier member 6 is adapted to pivot around a spindle 8 fitted between the plates 3 and 4 and extending in parallelism with the fuse axis. The primer-carrying member 6 is provided with a toothed sector 9 meshing with a pinion 10, which is rigid with an escape wheel 11. The spindle carrying the pinion 10 and the escape wheel 11 revolves in the bearings 12 and 13 formed respectively in the plates 4 and 5. The movement of the escape wheel 11 is controlled by a balance wheel 14 adapted to oscillate on a spindle 15 fitted between said plates 4 and 5. In the embodiment illustrated, the spindle 15 is tubular and allows a striker or else the flame produced by a primer located ahead of the pyrotechnical primer 7 to pass through it. It will be readily understood that the firing of the fuse can be obtained only when the member 6 carrying the primer 7 has executed an angular movement such as will bring the primer 7 underneath and in registry with the channel extending inside the tubular spindle 15. In order that the member 6 carrying the primer may be held fast in its inoperative position illustrated in FIG. 2 as long as the missile has not been fired by a rifled gun, two locking means are provided. The first of said locking means of a conventional type includes a transverse bolt 16 adapted to slide along a radial sideway 17 formed in an extension of the plate 4. A spring 18 acts in opposition to the transverse bolt 16 so as to hold it in its inner most radial position in which its inner end 19 engages a notch 20 in the primer-carrying member 6 and locks the latter in its inoperative position. Such locking means is therefore sensitive only to centrifugal force and can release the carrier member 6 only after the missile has been caused to rotate round its axis so as to provide a centrifugal force sufficient for the radial shifting of the bolt 16 outwardly against the action of the spring 18.

The fuse also carries second locking means for the carrier member 6, which means includes a longitudinal retaining bolt 21 extending through an opening 22 in the plate 4. Said bolt 21 is rigid with an enlarged head or plunger piston 23 subjected to the action of the spring 24 urging the bolt 21 away from the path of the carrier member 6. Said plunger piston 23 is adapted to slide inside a cylinder 25 the axis of which is parallel with that of the fuse. In the embodiment illustrated, the cylinder 25 forms an insert fitted between the plates 4 and 5. To this end, the plate 5 is provided with an opening 26 through which the cylinder 25 can be introduced. A shoulder 27 formed at the rear end of said cylinder 25 allows clamping the latter between the plates 4 and 5. A movable part such as a roller or ball 28, functioning together with cylinder 25 as a blocking means for bolt 21, is fitted inside the cylinder 25 between the front end 29 of the latter and the plunger piston 23. A lateral port 30 is provided in the peripheral wall of the cylinder 25 to face radially away from the axis of the fuse at an intermediate point of the length of said cylinder 25. The lateral port 30 allows the ball 28 to pass out of the cylinder 25, but only when the missile revolves around its axis, so that the ball may be driven out radially by centrifugal force only when the missile has been subjected, in addition to its rotation, to an axial acceleration which is sufficient to urge the piston 23 back against the pressure of the spring 24.

It should be noted that an opening 31, the diameter of which is less than that of the ball 28, formed in the front end 29 of the cylinder 25 allows ascertaining during the assembly of the fuse whether the ball 28 is actually present in its housing or otherwise.

The operation of the safety system for the fuse of a gyratory missile described hereinabove is as follows: when the missile is at rest together with the fuse, the primer-carrying member 6 is held fast accurately in its operative position by the transverse bolt 16 which can be urged away by centrifugal force. The longitudinal retaining bolt 21 provides a further guarantee for retaining the primer-carrying member 6 in its inoperative position, since said bolt 21 extends into the path of said primer-carrying member 6.

In the case of a shock on the base of the missile for instance, the transverse bolt 16 is retained in its locking position, while the longitudinal bolt 21 may, in the case of a sufficiently strong shock be shifted axially to a slight extent which causes the spring 24 to recede. However, such a shock can never be sufficient for the piston 23 to completely expose the port 30 and to allow the ball 28 to pass out of the cylinder 25, all the more so since the latter is not then subjected to any centrifugal force.

Upon firing of the missile out of a rifled gun, said missile is subjected to a very high axial acceleration at the start, which acceleration is followed by a high speed rotary movement of the missile round its axis. At the start, the longitudinal bolt 21 and the piston 23 are subjected to an axial shifting against the pressure of the spring 24, the bolt 21 thus remaining in the path of the carrier member 6. The piston 23 then exposes the port 30 and under the action of centrifugal force, the ball 28 can escape and pass out of the cylinder 25. Similarly, the transverse bolt 16 may escape radially out of the notch 20 against the action of its spring 18. The carrier member 6, although it has been released with reference to the bolt 16 cannot however begin rotating around its axis 8 before the axial acceleration exerted on the missile has stopped, which allows the bolt 21 and piston 23 to be urged forwardly by the spring 24. Since the ball 28 has been ejected from the cylinder 25 as disclosed, the piston 23 then reaches the front end 29 of the cylinder, so that the bolt 21 moves out of the path of the carrier member 6. The bolt 21 can reach this collapsed position only when the missile is actually outside the gun, since the axial acceleration stops only at such a moment. The carrier member 6 consequently executes its angular movement which is delayed by the escape mechanism 11, 14. When the carrier member 6 has finished executing its angular movement in an anticlockwise direction with reference to FIG. 2 under the action of centrifugal force, the primer 7 enters a position in registry with the fuse axis, i.e. with the channel formed inside the tubular spindle 15; the fuse is thus ready for operation, for instance at the moment of an impact against the target or possibly under the action of self-destroying means.

As a modification, the upper surface of the piston 23 may be given a concave shape so as to ensure a centering of the ball 28 and to hold the latter in its centered position in the case of the missile dropping on its base there preventing accidental displacement thereof.

I claim:

1. In a fuse for a gyratory missile fired by a rifled gun and carrying primer-actuating means, the combination of of a primer-carrying member adapted to be centrifugally urged during flight out of an inoperative position into registry with said primer-actuating means and a safety system comprising first locking means sensitive to centrifugal force holding said member in its inoperative position and released upon application of centrifugal force, second locking means including a member extending into the path of the primer-carrying member in its inoperative position, means urging said member forwardly out of said path, blocking means opposing the forward movement of said member and means through which the blocking means is urged out of the forward path of said member upon axial acceleration of the missile at the firing thereof to allow said forward movement of said member and consequent release of the primer-carrying means, said member extending into the path of the primer-carrying member comprising a longitudinally shiftable bolt, the rear end of which extends into the path of the primer-carrying member, said means urging said member forwardly comprising a spring at the rear of the bolt urging said bolt forwardly away from last-mentioned path, said blocking means including a cylindrical casing enclosing the front portion of the bolt and having a lateral port facing said front portion, and a ball fitted between the front end of the bolt and the front end of the casing and adapted to be thrown centrifugally through said lateral port upon retraction of the bolt and compression of said spring under axial acceleration of the missile at the start of said flight to allow the spring to urge the bolt towards the front end of the casing and out of said path of the primer-carrying member when axial acceleration has terminated.

2. A fuse as claimed in claim 1, wherein said cylindrical casing is provided with an inspection opening at its front end of less diameter than said ball to permit ascertaining during assembly of said fuse if said ball is in position within said casing.

3. In a fuse for a gyratory missile fired by a rifled gun and carrying primer-actuating means, the combination of a primer-carrying member adapted to be centrifugally urged during flight out of an inoperative position into registry with said primer-actuating means and a safety system comprising first locking means sensitive to centrifugal force holding said member in its inoperative position and released upon application of centrifugal force, second locking means including a member extending into the path of the primer-carrying member in its inoperative position, means urging said member forwardly out of said path, blocking means opposing the forward movement of said member and means through which the blocking means is urged out of the forward path of said member upon axial acceleration of the missile at the firing thereof to allow said forward movement of said member and consequent release of the primer-carrying means, said safety system including first, second and third transverse plates, and said first and second plates pivotally and eccentrically carrying said primer-carrying member together with said first locking means, said second plate provided with an opening, said member extending into the path of the primer-carrying member comprising a longitudinally shiftable bolt the rear end thereof extending through said opening in said second plate into the path of the primer-carrying member, said means urging said member forwardly comprising a spring at the rear of the bolt urging said bolt forwardly away from the path of said primer-carrying member, said blocking means including a cylindrical casing enclosing the front portion of the bolt and provided with a lateral port facing said front portion of said bolt, said cylindrical casing extending through said third transverse plate and carried by said second plate and a ball fitted between the front end of said bolt and the front end of said cylindrical casing and adapted to be ejected centrifugally through said lateral port upon retraction of the bolt and compression of the spring under axial acceleration of the missile at the start of its flight to allow the spring to urge the bolt towards the front end of the casing and out of said path of the primer-carrying member, when axial acceleration has terminated.

4. A fuse as claimed in claim 1, wherein said longitudinally shiftable bolt includes a plunger piston at its front end, said plunger piston being concave so as to insure centering of said ball thereon and retain said ball in its centered position to prevent accidental displacement thereof.

References Cited

UNITED STATES PATENTS

| 2,537,855 | 1/1951 | Porter | 102—79 |
| 2,651,993 | 9/1953 | Berzof et al. | 102—80 |
| 3,339,488 | 9/1967 | Borchers | 102—78 |

FOREIGN PATENTS

| 48,989 | 7/1934 | Denmark. |

BENJAMIN A. BORCHELT, Primary Examiner

JAMES FOX, Assistant Examiner